Figure 2:
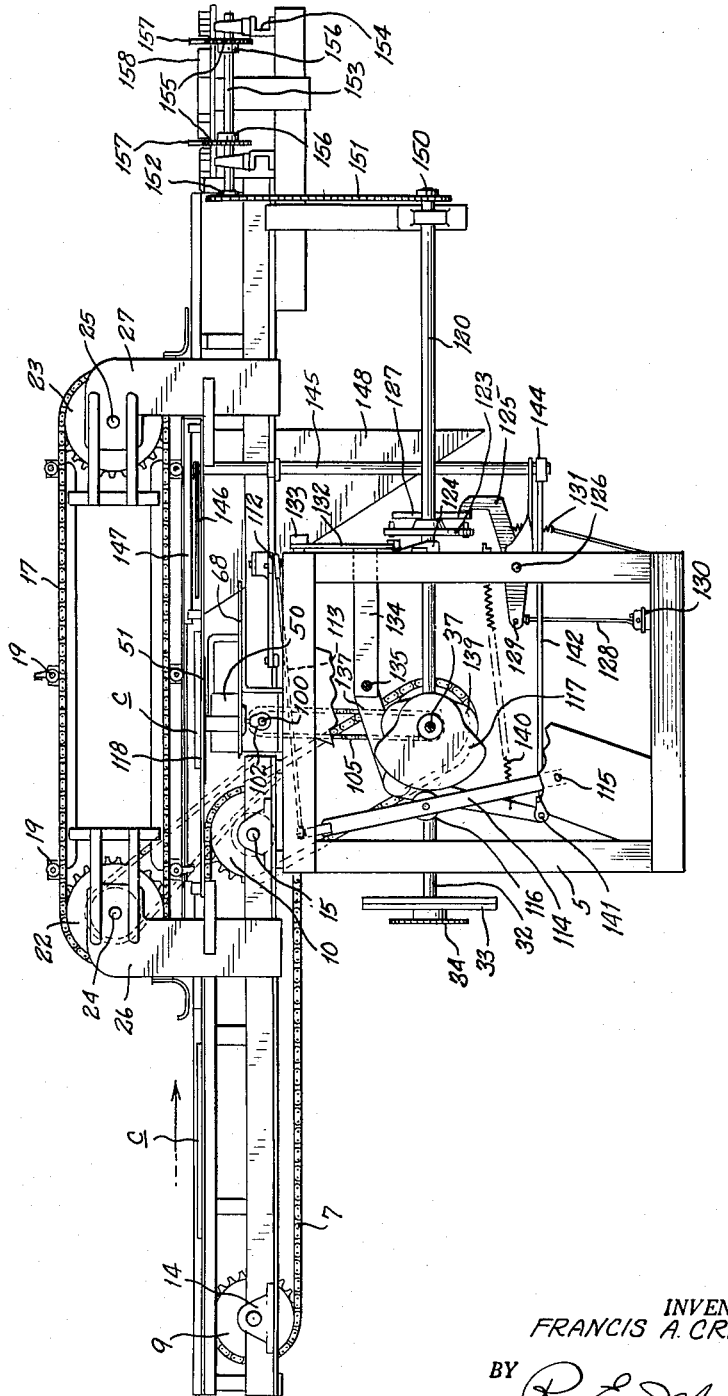

Oct. 31, 1961    F. A. CRAIG    3,006,469
CHECK-WEIGHING APPARATUS
Filed July 1, 1955    8 Sheets-Sheet 1
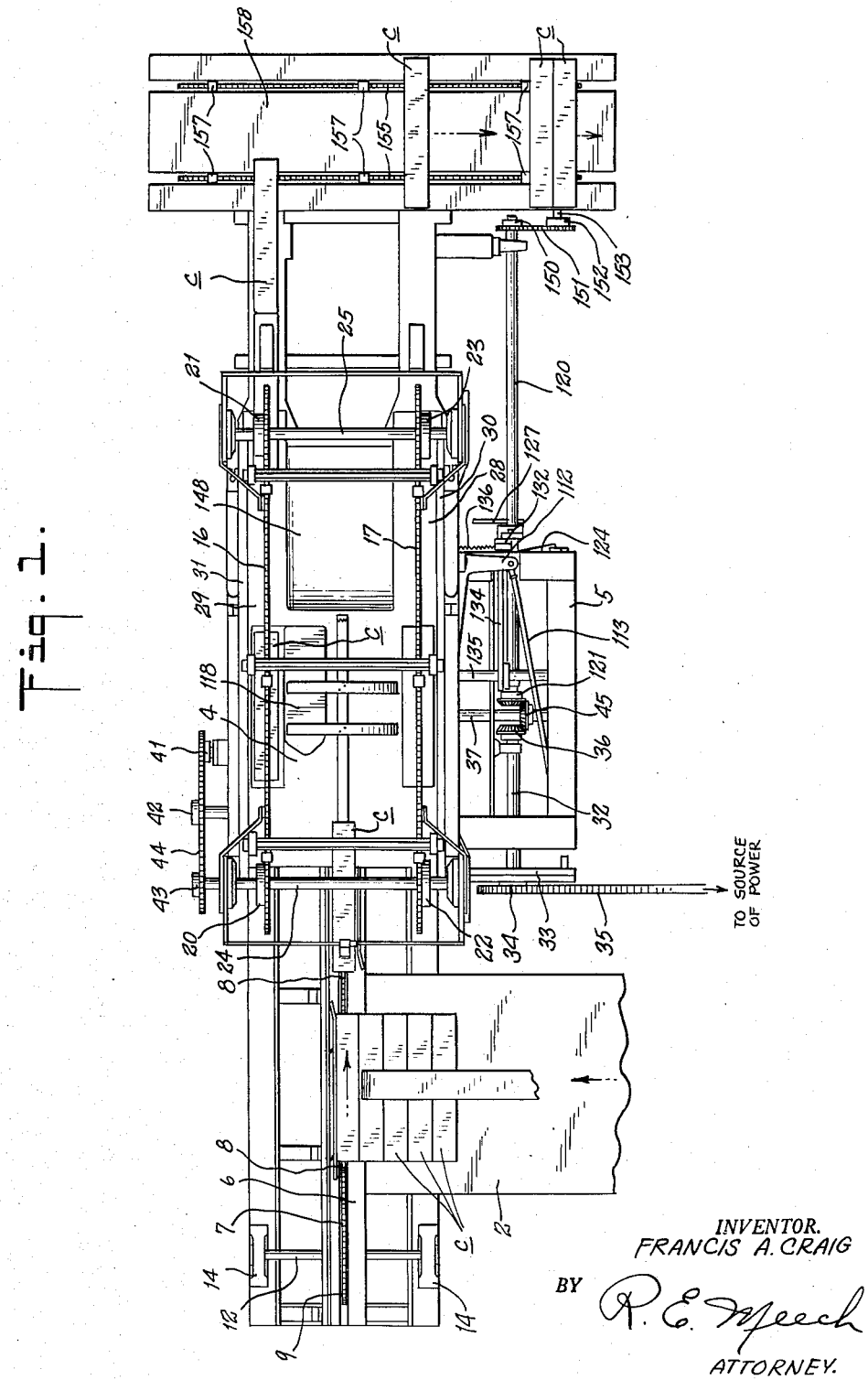
Fig. 1.
INVENTOR.
FRANCIS A. CRAIG
BY
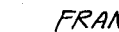
ATTORNEY.

INVENTOR.
FRANCIS A. CRAIG
BY R. E. Meech
ATTORNEY.

Oct. 31, 1961  F. A. CRAIG  3,006,469
CHECK-WEIGHING APPARATUS
Filed July 1, 1955  8 Sheets-Sheet 4

INVENTOR.
FRANCIS A. CRAIG
BY
R. E. Meech
ATTORNEY

Oct. 31, 1961  F. A. CRAIG  3,006,469
CHECK-WEIGHING APPARATUS
Filed July 1, 1955  8 Sheets-Sheet 6

INVENTOR.
FRANCIS A. CRAIG
BY
R. E. Meech
ATTORNEY.

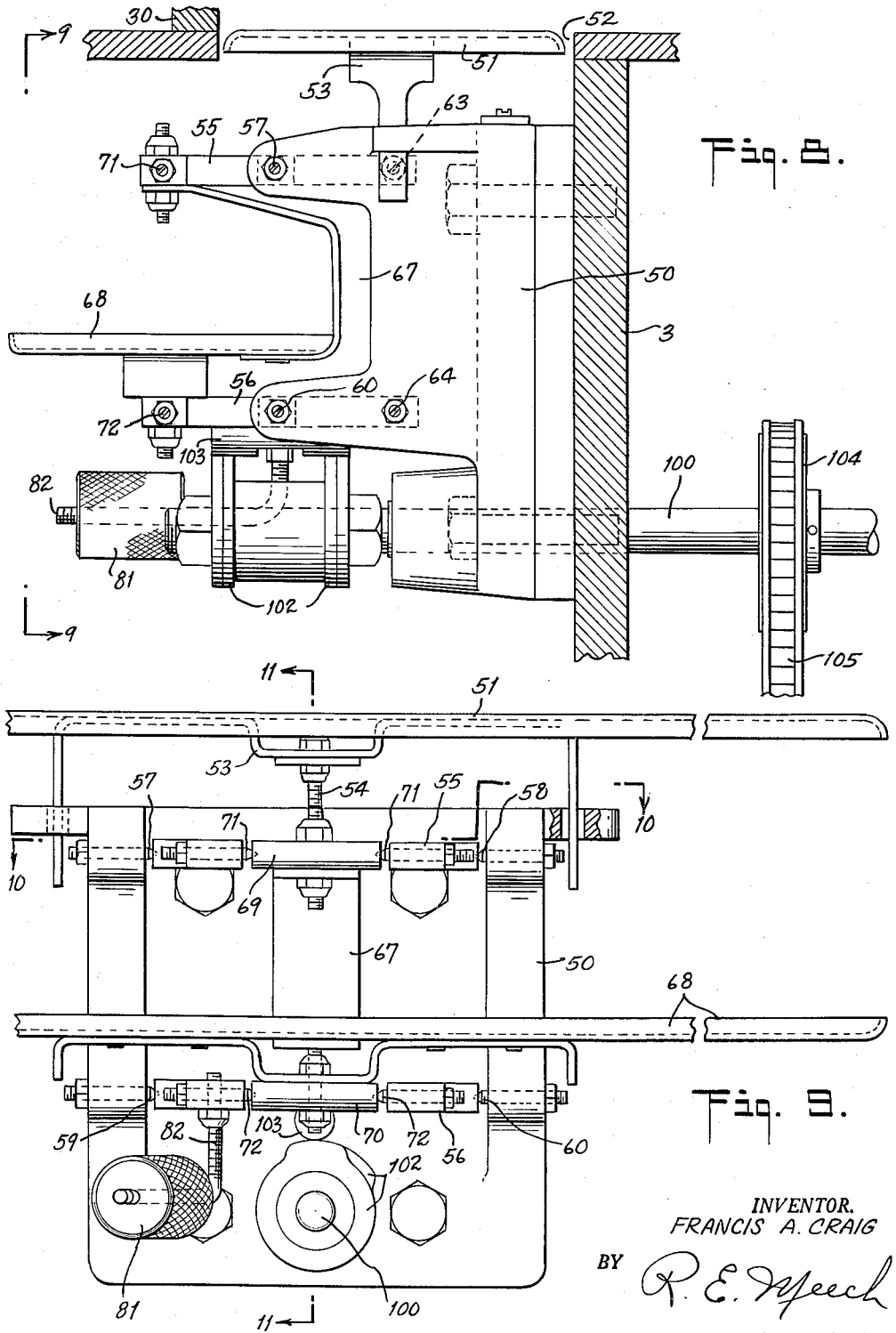

Oct. 31, 1961  F. A. CRAIG  3,006,469
CHECK-WEIGHING APPARATUS
Filed July 1, 1955  8 Sheets-Sheet 8
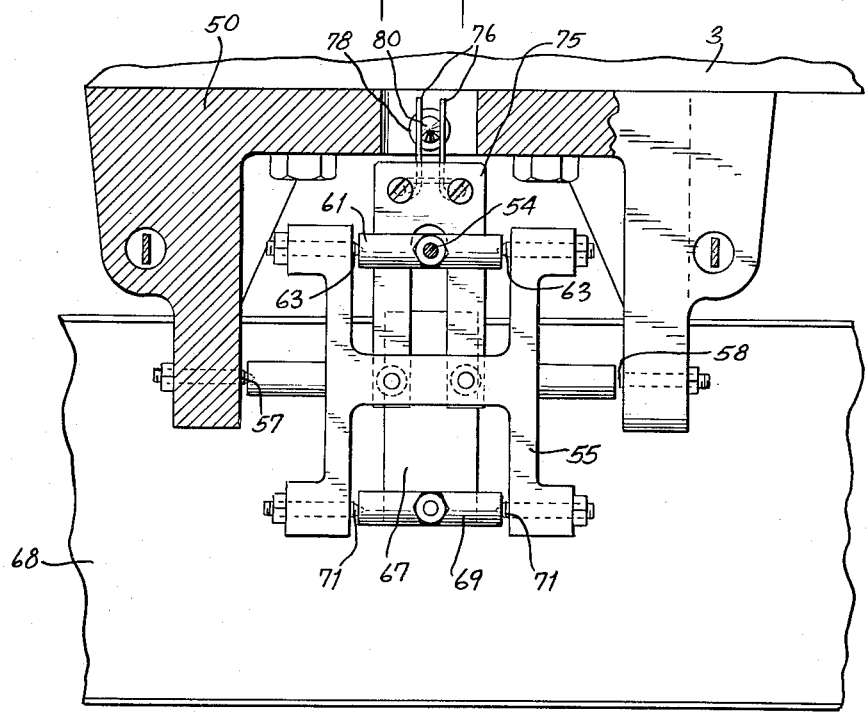
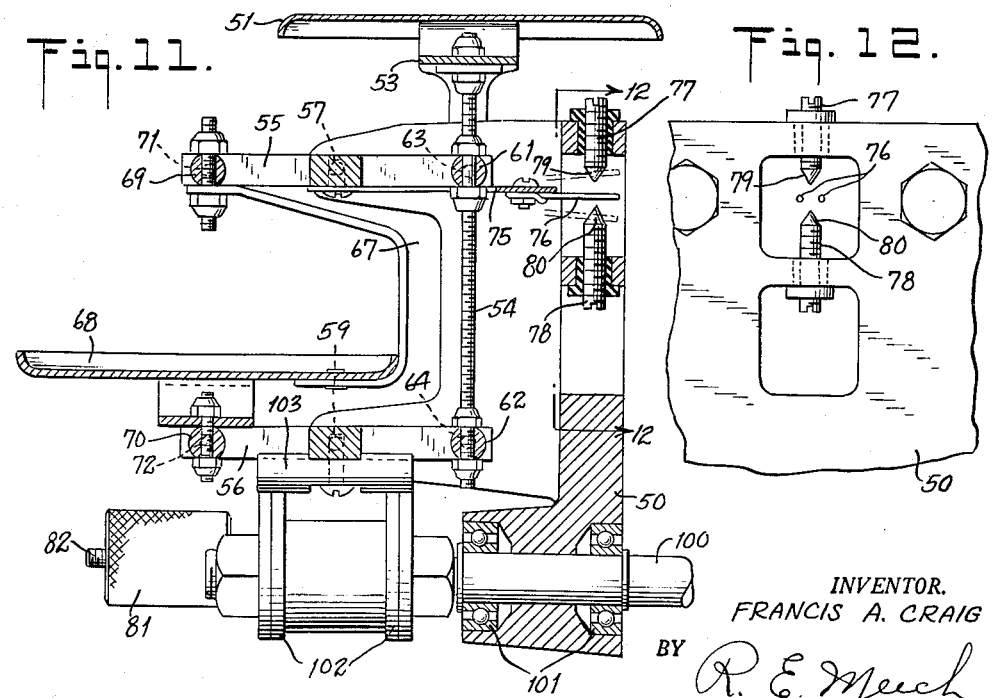
INVENTOR.
FRANCIS A. CRAIG
BY
ATTORNEY.

United States Patent Office 3,006,469
Patented Oct. 31, 1961

3,006,469
CHECK-WEIGHING APPARATUS
Francis A. Craig, Meadville, Pa., assignor to Talon, Inc., a corporation of Pennsylvania
Filed July 1, 1955, Ser. No. 519,452
10 Claims. (Cl. 209—121)

This invention relates to a check-weighing apparatus, to be incorporated with a conveying system, for detecting light-weight or over-weight boxes or containers and articles as they pass without interruption through the system.

In the packaging of articles, such as slide fasteners or zippers as they are more commonly called, it will be obvious that it is desirable that the proper number of articles be placed in each box or container. Oftentimes, it happens that too few or too many articles are placed in the boxes or containers. In the former case the purchasing public is cheated and the goodwill of the manufacturer is injured, and in the latter case the manufacturer has given more articles than he bargained to give for a particular price and, consequently, he takes a loss. It will be obvious that the boxes or containers containing such articles can be checked by weight after the packaging operation to ascertain whether or not the boxes or containers contain the proper and desired number of articles in order to overcome the above mentioned deficiencies.

More specifically, the apparatus of the present invention is adapted for sensitive and high speed check-weighing of various commodities through the use of a system in which such commodities continuously travel in single successive order along a plurality of adjoining conveyor sections toward a diverting zone having discarding means such as movable arm-like members for diverting the weighed commodities out of the conveyor system. Conveyors of this type often are interposed between a packaging station where the articles are placed in the boxes or containers and a delivery station where the packaged boxes or containers are placed in large cartons for the purpose of shipment. In this apparatus at least one of the conveyor sections forms a component part of a weighing mechanism and over which the containers or articles being handled are individually passed without interruption in their movement, whereby variations in weight of the articles or containers applied to the weighing mechanism produce proportionate variations in a pivotally mounted member of the weighing mechanism, electro-responsive means being associated with said member to effect automatically changes in position of the diverting arm-like members, so that containers or articles of a desired or proper weight will be caused to follow a selected course of discharge from the apparatus.

While various types of check-weighing apparatus have heretofore been suggested and used, some of them were not satisfactory for use with certain containers and articles. They were objectionable in that they lacked sensitivity in responding to the minute variations in the articles or containers being checked and lacked the inability for continuous high speed weight-checking operations in conformity with the other packing operations. Also, some of these check-weighing devices would not permit the conveyor system to operate continuously when no article or container was on the weighing mechanism or when a light-weight or over-weight article or container was positioned thereon. It is to an improved check-weighing apparatus wherein the above mentioned disadvantages are eliminated that the present invention relates.

Accordingly, it is the general object of the present invention to provide an improved check-weighing apparatus adapted for use in checking the weights of filled containers delivered thereto from a packaging conveyor and for rejecting those containers whose weights exceed or fall below a predetermined weight.

It is another object of the invention to provide an improved check-weighing apparatus wherein the articles or containers move continuously and uninterrupted into and through the apparatus while undergoing weighing and which apparatus is highly accurate and responsive to the minute weight variations of the articles or containers being handled in separating over or under weight articles or containers from those of a desired or predetermined weight.

It is a further object of this invention to provide in a check-weighing apparatus an improved electric-responsive control actuated by the weighing mechanism for controlling the operation of diverter associated with the conveyor for causing under-weight and over-weight articles or containers to be discarded or discharged from the conveyor system.

It is still another object of the present invention to provide an improved check-weighing apparatus which is simple and inexpensive in its construction and at the same time, efficient and effective in its use requiring a minimum amount of maintenance and attention from the operator.

Various other objects and advantages of this invention will be more apparent in the course of the following specification, and will be particularly pointed out in the appended claims.

In the accompanying drawings, there is shown for the purpose of illustration, an embodiment which my invention may assume in practice.

Figure 3:
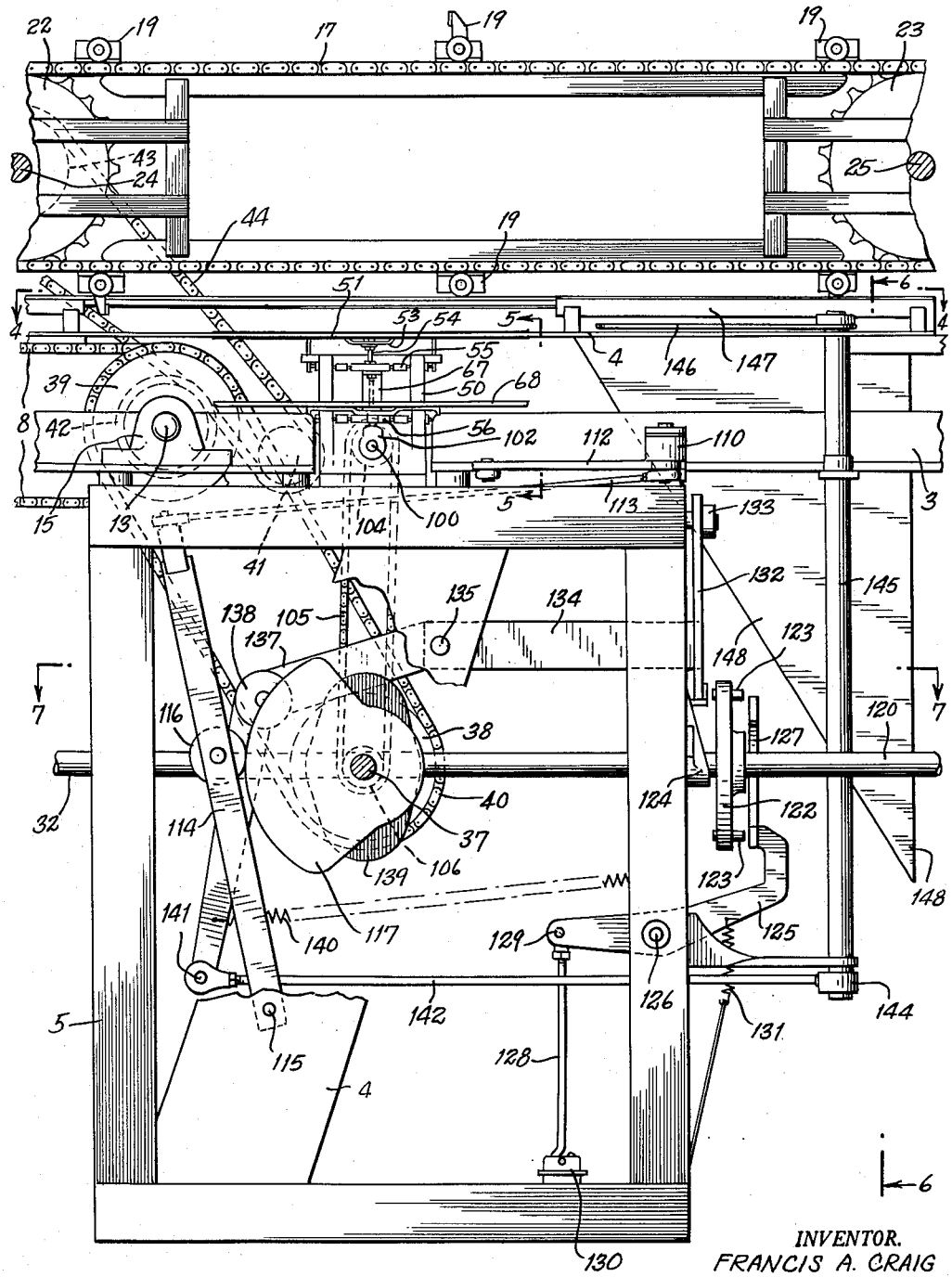
Figure 4:
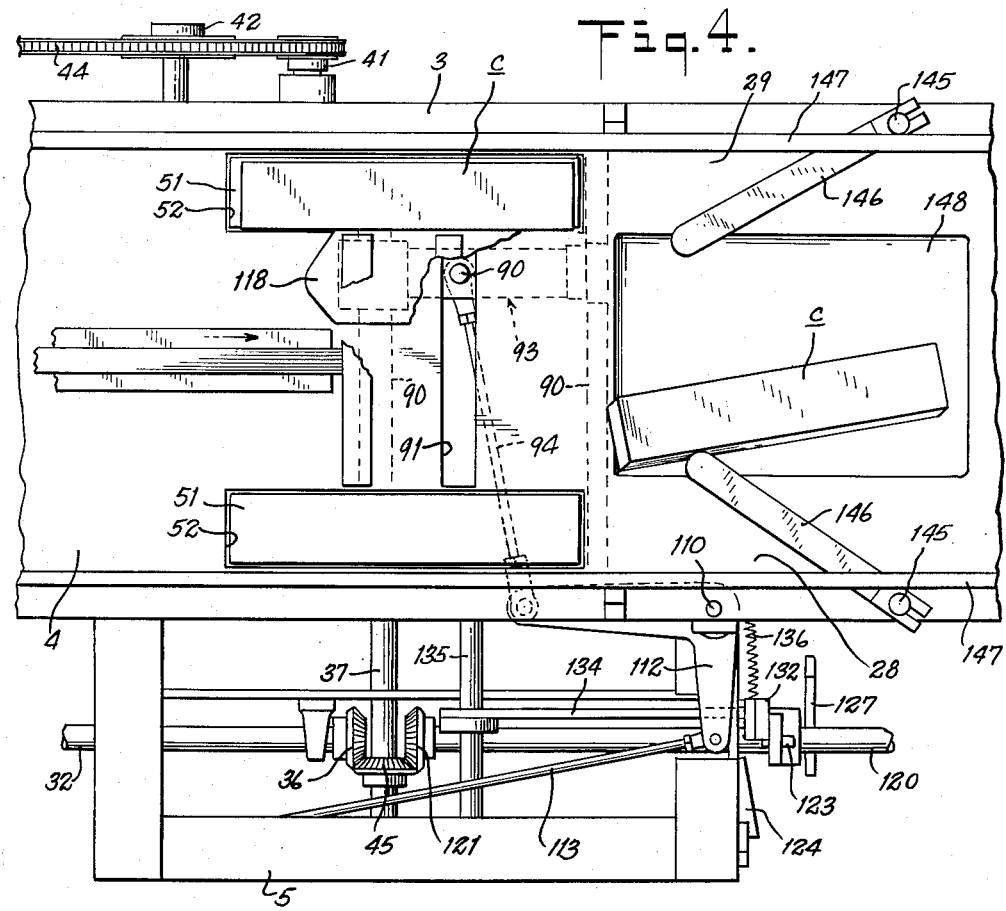
Figure 5:
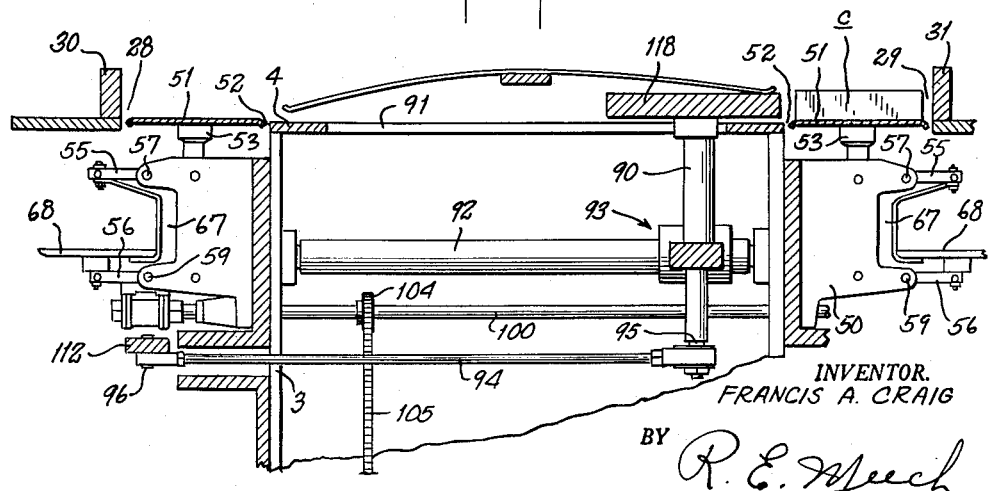
Figure 6:
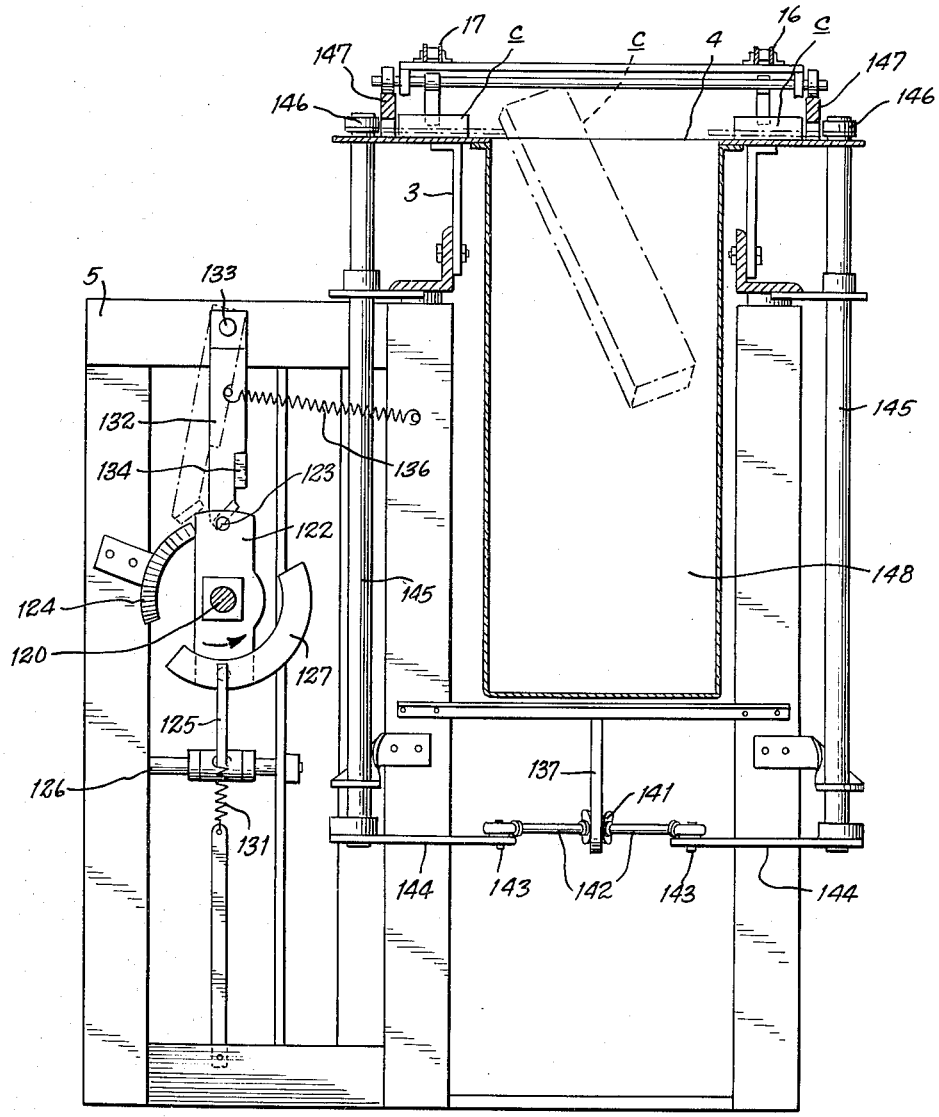
Figure 7:
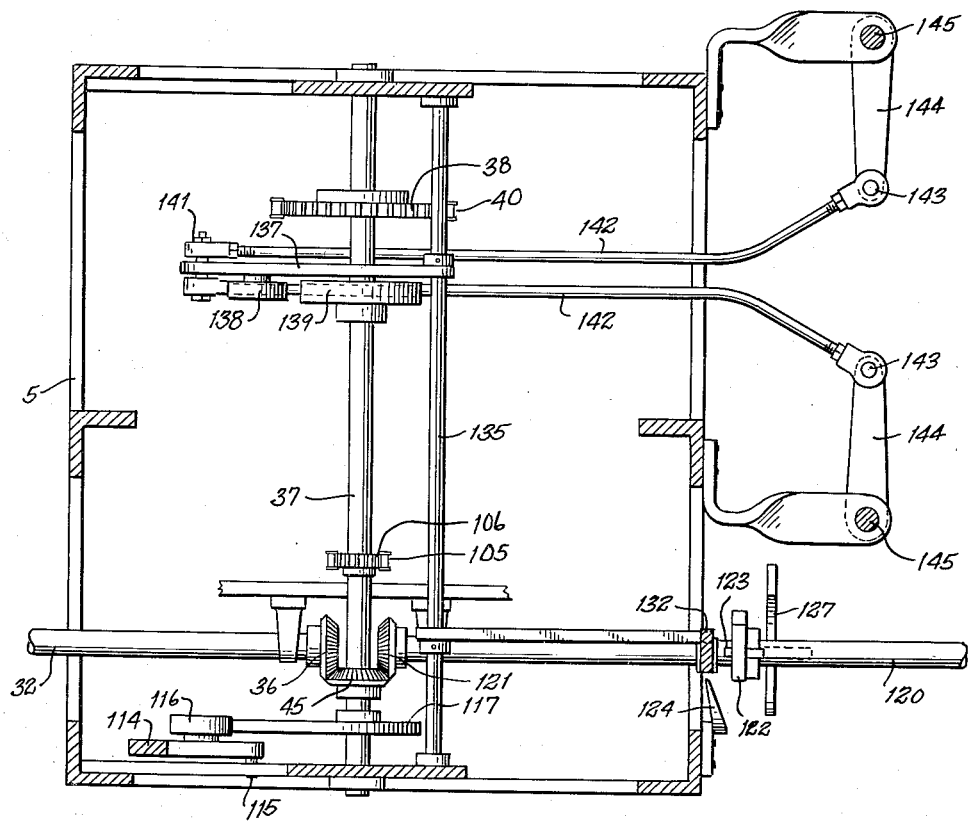
Figure 13:
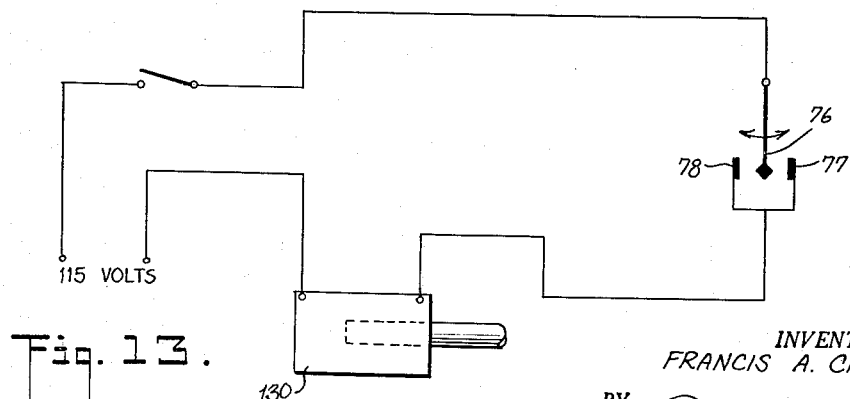

In these drawings:

FIG. 1 is a plan view of the improved check-weighing apparatus constructed in accordance with the present invention, FIG. 2 is a side elevational view thereof, FIG. 3 is an enlarged side elevational view similar to FIG. 1 showing the weighing scales and the discarding mechanism more in detail, FIG. 4 is a sectional view taken on line 4—4 of FIG. 3 showing the kicker means operating to discard a container and a container at one of the weighing stations, FIG. 5 is a sectional view taken on line 5—5 of FIG. 3, FIG. 6 is a sectional view taken on line 6—6 of FIG. 3, FIG. 7 is a sectional view taken on line 7—7 of FIG. 3, FIG. 8 is an enlarged end view directly at one of the counterweighted sections showing the platforms in their normal positions, FIG. 9 is a sectional view taken on line 9—9 of FIG. 8, FIG. 10 is a sectional view taken on line 10—10 of FIG. 9, FIG. 11 is a sectional view taken on line 11—11 of FIG. 9, FIG. 12 is a sectional view taken on line 12—12 of FIG. 11, and FIG. 13 is a wiring diagram for the control of the solenoid for actuating the kicker means.

The present invention is primarily intended for detecting abnormal weight containers of elongated rectangular-shaped form, and particularly to a box or package which is adapted to contain a predetermined number of articles, such as packaged slide fasteners in the present instance, but the principles thereof may be applied to other types of containers as well as articles of any nature.

It will be understood that the articles, such as packaged slide fasteners, are placed in the containers manually or by suitable packaging equipment which constitutes no part of the present invention prior to being transmitted to the present apparatus. After the articles have been placed in the containers or boxes, the apparatus of the present invention then ascertains by weight whether the boxes or containers have the desired number of articles therein. Accordingly, the container packaging equipment is not shown.

Referring now more particularly to the drawings, after the articles have been packaged in the boxes or containers C they are positioned preferably on a delivery conveyor belt 2, in side-by-side relation, as shown in FIG. 1, and conveyed thereby to position adjacent one end of the apparatus of the present invention, which is positioned substantially at right angles to the conveyor belt 2.

Conveying mechanism

The apparatus of the present invention consists preferably of an elongated table-like structure 3 having a flat-surfaced central top portion 4 and which is supported centrally thereof preferably by suitable framework 5. Directly at the end of the conveyor belt 2 there is arranged at the end of the table-like structure 3 centrally thereof, a longitudinally extending guideway or trough 6 into which the containers C successively pass from the conveyor belt 2. In a longitudinally extending opening in the bottom of this guideway or trough 6, there is arranged an endless conveyor chain 7 having a series of spaced-apart fingers 8 arranged therealong which project up into the guideway or trough 6 as the chain is moved therealong and act as pushers to move the containers C along the guideway in end to end relation. It is the purpose of these pusher fingers to abut the end of the box or containers C in the guideway or trough and move them successively therealong and to the right as shown in FIGS. 1 and 2. This endless chain 7 is disposed around sprockets 9 and 10 arranged on rotatable shafts 12 and 13, respectively, which in turn are mounted in suitable bearings 14 and 15, respectively, mounted on the table-like structure 3.

Intermediate the length of the table-like structure 3 and forwardly of the endless conveyor chain 7, there is arranged above the flat top surface 4, a pair of similar endless conveyor chains 16 and 17 with one arranged to either side of the flat top surface which also have a series of spaced-apart fingers 18 and 19, respectively, arranged therealong, and which also act as pushers to move the containers C along the flat top surface 4. The fingers or pushers 18 on chain 16 are staggered relative to the fingers or pushers 19 on the chain 17. These endless chains 16 and 17 are disposed around sprockets 20, 21 and 22, 23, respectively, which sprockets are mounted on rotatable shafts 24 and 25. These shafts 24 and 25 are mounted in suitable bearings carried by brackets 26 and 27 respectively, which are carried by the table-like structure 3 and which extend thereabove, as more clearly shown in FIG. 2.

Directly below the endless chain conveyors 16 and 17 there are arranged guideways or troughs 28 and 29, respectively, formed by side flange members 30 and 31, respectively, along which the containers C are adapted to be moved by the pusher fingers 18 and 19 upon movement of the endless chains 16 and 17.

Adjacent one side of the framework 5, there is mounted in suitable bearings carried thereby, as more clearly shown in FIGS. 1, 2 and 3, a rotatable shaft 32 with which there is arranged a friction clutch 33 at one end thereof and a sprocket 34. There is arranged around the sprocket 34, a drive chain 35 which is connected to a suitable source of power such as the shaft of an electric motor (not shown) for rotating the shaft 32. On the opposite end of the shaft 32, there is mounted a miter gear 36 which meshes with a similar gear 45 arranged on the end of a shaft 37 which extends at right angles thereto. On this shaft 37, there is mounted a sprocket 38 and there is disposed around this sprocket 38 and a sprocket 39 mounted on the shaft 13, a driving chain 40.

On the opposite side of the table-like structure 3, there is mounted thereon, an idler sprocket 41 and there is disposed around this sprocket as well as a sprocket 42 carried by the shaft 13 and another sprocket 43 carried by the shaft 24, a driving chain 44. Thus it will be seen that the endless conveyor chains 7, 16 and 17 are driven continuously by the shafts 32, 37 and the driving chains 40 and 44 connected thereto by means of the various sprockets.

Weighing station

To either side of the table-like structure 3, centrally of the flat-surfaced top 4 thereof, there is provided a weighing station or scales which constitutes the most important aspect of this invention. These weighing stations are identical in construction so only one will be described in detail. Each of these weighing stations includes a main bracket 50 mounted on the side of the table-like structure 3 and a counterweighted, rectangular-shaped, movable platform 51 which is disposed in an opening 52 arranged in the guideways or troughs 28 and 29 in the flat-top surface 4 to either side thereof directly below the respective endless conveyor chains 16 and 17, as more clearly shown in FIGS. 3, 4, 5 and 8 of the drawings. The platform 51 is supported by a bracket 53 connected thereto which in turn is mounted on the upper end of an elongated adjustable screw 54. There is provided an upper, substantially H-shaped, yoke-like member or beam 55 and a similar lower, substantially H-shaped yoke-like member or beam 56, which are pivotally attached to the main bracket 50 by means of adjustable pivot bearings 57, 58 and 59, 60, respectively, as more clearly shown in FIGS. 9, 10 and 11 of the drawings. The inner ends of each of the yoke-like members 55 and 56 are pivotally attached to the elongated screw 54 by means of bar-like members 61 and 62, respectively, and adjustable pivot bearings 63 and 64 respectively. There is arranged between the two yoke-like members or beams 55 and 56, at the outerside thereof, a yoke-like member 67 with which there is arranged a second platform or tray 68. This yoke-like member 67 is pivotally attached to the outer ends of the yoke-like members 55 and 56 by means of bar-like members 69 and 70, respectively, and pivot bearings 71 and 72, respectively. It will be understood that the H-shaped yoke-like members or beams 55 and 56 are maintained in substantially parallel relation and function as a parallelogram when either platform 51 or 68 is moved, due to the various pivotal connections.

There is arranged with the upper beam 55, a bracket member 75 to which there is secured a contact member in the form of a pair of resilient, spaced-apart finger-like members 76. On the bracket 50, there is mounted a pair of oppositely disposed contact members 77 and 78 in the form of adjustable screws which co-operate with the finger-like members 76. The opposed ends of each of the screws 77 and 78 are tapered to a point, as at 79 and 80, respectively, and are adapted to enter into the space between the finger-like members 76 and make contact with the tapered end surfaces thereof when the platforms 51 and 68 are moved. Both of these contact members 77 and 78 and the finger-like members 76 are arranged in an electrical circuit, as shown in the wiring diagram of FIG. 12, and serve as a switch mechanism for controlling the actuation of mechanism for actuating the discarding or kicker means hereinafter to be described. There is arranged with the lower yoke-shaped member or beam 56, as shown in FIGS. 8 and 9, an adjustable counterbalance 81 which is attached thereto by means of an arm 82.

Directly below the weighing stations or scales, there is arranged a transversely extending shaft 100 mounted in suitable bearings 101 arranged in the side walls of the table-like structure 3. On the outer ends of this shaft 100, there is mounted a pair of cams 102 which co-operate with a cam shoe 103 secured to the under side of the yoke-shaped member or beam 56. It is the purpose of these cams 102 to co-operate with the respective cam shoes 103 to maintain the platforms 51 and 68 in their normal positions, such as for example when a container is not positioned on the upper platform 51 as will be described. Intermediate the length of this shaft 100, there is arranged thereon, a sprocket 104 around which there is disposed a driving chain 105 which is also disposed over and around a sprocket 106 arranged on the shaft 37.

Pusher mechanism

On top of the framework 4, as more clearly shown in FIGS. 3 and 4, there is pivotally mounted thereon, as at 110, a bell-crank member 112 having one end thereof pivotally attached to one end of a tie rod 113. The opposite end of this tie rod 113 is pivotally attached to the upper end of a lever 114 and the lower end of this lever 114 is pivotally attached to the framework 4, as at 115. Intermediate the length of this lever 114, there is mounted thereon, a cam follower 116 which co-operates with a cam 117 arranged on the shaft 37. On the flat top surface 4 of the table-like structure 3, there is arranged a pusher member 118 which is adapted for lateral reciprocable movement across the flat top surface 4. There is arranged with this pusher member 118, a stud-like member 90 which extends through a transversely extending opening 91 arranged in the flat top surface 4, as more clearly shown in FIGS. 4 and 5 of the drawings. Directly below the flat top surface 4, there is arranged a pair of spaced-apart transversely extending rod-like rails 92 on which there is mounted a carriage-like member 93 for lateral movement. This stud-like member 90 is attached to this carriage-like member 93. There is provided a tie-rod 94 having one end thereof pivotally attached, as at 95, to the carriage-like member 93, and the opposite end of this tie rod 94 is pivotally attached, as at 96, to the other end of the bell-crank 112. It is the purpose of this pusher member 118 to move the boxes or containers to one side or the other of the flat top surface 4 as they are successively delivered thereonto by means of the conveyor chain 7 alternately onto one or the other of the platforms 51 at the weighing stations so as to be checked as to weight.

Discarding mechanism

In suitable bearings carried by the framework 5, there is arranged another shaft 120 in line with shaft 32. On one end of this shaft 120, there is arranged a miter gear 121 which meshes with gear 45, as more clearly shown in FIGS. 1, 4 and 7 of the drawings. There is also arranged on this shaft 120 intermediate the length thereof adjacent one side of the framework 5, a member 122 which rotates with the shaft 120. There is carried by this member 122 a pair of diametrically opposed movable pins 123 extending parallel to the shaft 120 which are disposed normally outwardly or in the position, as shown in FIGS. 3 and 7 of the drawings. There is arranged on the side of the framework 5, an arcuated cam shoe member 124 which is adapted to co-operate with the inner end of these pins 123 to move and maintain them in their normal positions. On the side of the framework 5, there is mounted a lever 125 which is pivotally attached to the framework, as at 126. On one end of this lever 125, there is arranged an arcuated shoe-like cam member 127 which is disposed partially around the shaft 120 and which is also adapted to co-operate with the pins 123 to move them inwardly. At the opposite end of this lever 125, there is arranged a rod 128 having one end pivotally connected thereto, as at 129, with the other end of this rod being connected to the plunger of a solenoid 130 positioned at the bottom of the framework 5. There is provided a coil spring 131 arranged between the framework 5 and the outer end of the lever 125 for maintaining the lever in its outward or retracted position, as shown in FIG. 3.

There is also arranged on the outer side of the framework 5, above the shaft 120, a movable latch lever 132 which is pivotally attached to the framework, as at 133. This latch lever 132 co-operates with the end of a lever 134 with the opposite end of the lever 134 being securely attached to a transversely extending shaft 135 mounted in suitable bearings carried by the framework 5, as more clearly shown in FIG. 7 of the drawings. The lower end of the latch lever 134 co-operates with the pin 123 in a manner and for a purpose to be explained and this latch lever is maintained in its normal position by means of a coil spring 136.

In under the flat top 4 of the table-like structure 3, there is arranged a lever 137 having one end thereof secured to the shaft 135. There is arranged with this lever 137, a cam follower 138 which co-operates with a cam 139 carried by the shaft 37. There is provided a coil spring 140 for maintaining the cam follower 138 against the cam 139. The opposite end of the lever 137 is pivotally attached, as at 141, to one end of a pair of tie rods 142. The opposite ends of these tie rods 142 are pivotally attached, as at 143, to one end of a pair of opposed levers 144. The opposite end of each of these levers 144 are secured to the lower ends of a pair of vertically extending shafts 145 with one arranged in suitable brackets or bearings to either side of the table-like structure 3, as more clearly shown in FIGS. 3 and 6 of the drawings. On the upper ends of each of these shafts 145, there is secured thereto kicker means in the form of flat arm-like members 146 which are positioned adjacent to the flat-top surface 4 and which are adapted to oscillate laterally thereof. Each of these arm-like discarding or rejecting members 146 are disposed normally in a space in under guide rails 147 which are extensions of the guide flanges 30 and 31.

There is arranged in the flat top surface 4 as a point between these paddle-like discarding members 146, a discharge chute 148 into which the containers C not of the proper weight are moved by the arm-like members 146 in a manner to be later explained.

As more clearly shown in FIGS. 1 and 2 of the drawings, on the extreme outer end of the shaft 120, there is arranged a sprocket 150 around which there is disposed a driving chain 151 which is also disposed around a sprocket 152 arranged on the end of a shaft 153 arranged at one end of a framework 154 positioned at the delivery end of the apparatus of the present invention. At the opposite end of this framework 154, there is arranged another shaft having a pair of sprockets arranged thereon. There is provided a pair of spaced-apart conveyor chains 155 which are disposed around these last mentioned sprockets and a pair of spaced-apart sprockets 156 arranged on the shaft 153. Along each of these conveyor chains 155, there is arranged a series of spaced-apart finger or pusher members 157 which are adapted to move the containers C along the flat top surface 158 thereof to a packing station (not shown) as they are delivered thereto from the check-weighing apparatus.

Operation

Having described the construction of the improved apparatus of my invention, the manner in which it functions will now be described. Before the check-weighing of the containers is started, a container or box having the proper or desired number of articles therein and, consequently, being of the proper weight, is first positioned on the trays or platforms 68 of the weighing scales. These boxes or containers will act as a counterbalance and be the standard measure for all other containers or boxes of that particular size adapted to pass through the apparatus. As hereinbefore stated the articles are placed in the containers or boxes C at a station not shown and then positioned on the conveyor belt 2 to be transferred to the apparatus of the present invention. As the containers or boxes C leave the end of the conveyor belt 2, as shown in FIG. 1, they are deposited over the conveyor chain 7 on the table-like structure 3, and moved therealong in end-to-end relation by means of the pusher fingers 8 carried by the conveyor chain 7. The containers C are successively moved, uninterruptedly, to a position on the flat top surface 4 directly opposite the pusher member 118 and the weighing stations. This pusher member 118 then moves the containers C laterally onto one or the other platforms 51 of the weighing scales, depending upon which platform is adapted to receive that particular container for weighing.

Immediately before and while the particular container is being moved on the platform for weighing, the cam 102 on the shaft 100 is positioned at its extreme upward travel so that the weighing mechanism is maintained in its normal position and is not disturbed by movement of the container thereonto by the pusher member 118. It will be seen that the container in such position on the platform 51 will be disposed directly in under the conveyor chains 16 or 17 as the case may be. As the shaft 100 continues to rotate, the cam 102 carried thereby will move out of contact with the cam follower 103 thereby permitting the scales to function. If the container being checked on the platform 51 is of the proper weight, the scales balance and nothing happens except that the pusher fingers 18 or 19 on the conveyor chains 16 and 17 as the case may be, move the container off the platform to position at the end of the table-like structure and onto the flat surface 158 of the receiving conveyor at the end thereof. The containers are then conveyed in side-by-side relation by means of the conveyor chain 155 to a packaging station.

However, in the event the container C positioned on the platform 51 is under-weight or over-weight, the scales are tilted. If it is under-weight, platform 51 will move upwardly due to the counterbalancing effect of the container of the proper weight positioned on the tray or platform 68. In such event the pair of contact fingers 76 will be moved into contact with the tapered end of the upper contact member 77. If the container is over-weight the platform 51 will move downwardly and the pair of contact fingers 76 will be moved into contact with the tapered end of the lower contact member 78. In either case, these contacts will close the electrical circuit through the solenoid 130, as shown in FIG. 13 thereby momentarily energizing the same.

When the solenoid 130 is energized the plunger thereof is drawn inwardly, the rod 128 to which it is connected is moved downwardly. This rod 128 in turn moves the lever 125 about its pivotal connection at 126 which in turn moves the arcuated cam shoe 127 carried thereby inwardly or to the left, as shown in FIGS. 2, 3 and 7. This movement of the cam shoe 127 will move the lowermost pin 123 carried by the member 122 inwardly or to the left. It will be understood that the shaft 120 to which the member 122 is secured is rotating at all times. As the shaft 120 together with the member 122 carried thereby continues to rotate, the pin 123 moves through an arc of 180 degrees and strikes the lower end of the latch member 132 and moves it to the left, as shown in the broken lines of FIG. 6, against the action of the spring 136 and out of engagement with the end of the lever 134. This permits the lever 134 to move upwardly thereby rotating the shaft 135 to which it is connected and permits the cam follower 138 on the lever 137 to move into contact with the cam 139 on the shaft 37, due to the action of the spring 140. The cam 139, which is continuously rotating, will then move the lever 137 and the tie rods 142 connected thereto and the tie rods 142 in turn will move the levers 144 which in turn will oscillate the shafts 145. The shafts 145 will in turn move the arm-like members 146 inwardly across the flat table top surface 4 and into engagement with the under-weight or over-weight container C as it leaves the weighing station and forces it into the discharge chute 148, as shown in FIG. 4 of the drawings.

After the under-weight or over-weight container is moved off the platform 51, both the platforms 51 and 68 are returned to and maintained in their normal positions by means of the cams 102 in readiness for receiving the next container C to be check-weighed. The arm-like reject members 146 will also be moved to their retracted positions in under the rails 146 due to the movement of the cam 139 and associated linkage with lever 137 and the end of the lever 134 will again be locked in the notch or shoulder in the side of the latch member 132 in readiness for rejecting the next under-weight or over-weight container. The pin 123 is moved outwardly to its normal position upon continued rotation of the shaft 120 and the member 122, by means of the cam shoe 124.

As a result of my invention, it will be seen that the containers move continuously through my improved check-weighing apparatus without interruption. It will be understood that two weighing stations are provided so as to make this possible which results in a most efficient apparatus. It will also be seen that the apparatus consists of a minimum number of co-operating parts which are simple and effective in their operation.

It will also be seen further that the weighing scales are constructed and arranged so that they are extremely sensitive and as a result will act efficiently and effectively to reject a container of abnormal weight. By using a container of the proper or desired weight as a counterbalance, it will be assured that all containers of abnormal weight will be rejected by the apparatus thereby eliminating any danger of error. The switch mechanism, which consists of the spaced-apart finger-like members 76 and the contact members 77 and 78 is simple in design but yet so constructed and arranged so as to insure a perfect contact at all times and much more efficient than other types of switches heretofore suggested and used.

While I have shown and described an embodiment which my invention may assume in practice, it will be understood that this embodiment is merely for the purpose of illustration and description, and that other forms may be devised within the scope of my invention as defined in the appended claims.

What I claim as my invention is:

1. In a conveyor system, apparatus for detecting articles not of the proper weight comprising a flat-surfaced table-like structure over and along which the articles are moved, conveyor means arranged at one end of said table-like structure centrally thereof for delivering the articles thereto without interruption, means for delivering the articles to said first conveyor means, a weighing station arranged with and positioned adjacent each side of said table-like structure, a vertically activated weighing platform arranged at each of said weighing stations substantially in the plane of the top of said table-like structure on and over which the articles are moved, two conveyor means arranged at a spaced distance above said table-like structure and said weighing stations with one arranged adjacent each side thereof for moving the articles over the respective platforms and along said table-like structure, laterally reciprocable means for moving the articles alternately from said first conveyor means into the paths of either of said second conveyor means, laterally actuated kicker means arranged forwardly of each of said platforms for removing articles not of the proper weight from the table-like structure, and means responsive to the vertical movement of each of said platforms for controlling the actuation of said kicker means.

2. In a conveyor system, the combination as defined in claim 1, wherein the means responsive to the movement of each of said platforms for controlling the actuation of said kicker means includes a switch mechanism arranged with each of said platforms and a solenoid controlled by each of said switch mechanisms, and means controlled by the energization of said solenoids for actuating said kicker means.

3. In a conveyor system, the combination as defined in claim 1, including a second platform at each weighing station which is adapted to counterbalance the respective first mentioned platforms when an article of the desired weight is positioned thereon.

4. In a conveyor system, the combination as defined in claim 1, wherein the means responsive to the movement of each of the platforms for controlling the kicker means includes a switch mechanism arranged with each of said platforms, each of said switch mechanisms consisting of a pair of spaced-apart finger-like members arranged with each of said platforms, a pair of oppositely disposed contact members arranged at each weighing station directly opposite said finger-like members with which they co-operate, each of said contact members having end portions which taper substantially to a point and which are adapted to enter the space between the finger-like members and make contact therewith upon movement of the respective platforms.

5. In a conveyor system, the combination as defined in claim 4, wherein the means responsive to the movement of each of the platforms for controlling the actuation of the kicker means includes an electrical circuit for each weighing station and in which each of said switch mechanisms are arranged, a solenoid arranged in each of said circuits, and means controlled by the energization of said solenoids for actuating said kicker means.

6. In a conveyor system for handling containers having a weighing section including a vertically movable platform arranged therewith over which the containers pass successively through the system and which is adapted to be actuated thereby and another vertically movable platform which is adapted to act as a counter-balance for said first mentioned platform and upon which a container of the proper weight is adapted to be positioned, and means interconnecting both of said first and last platforms, and a conveyor for moving the containers successively over and along the weighing section and through the system, a switch mechanism arranged with said first mentioned platform consisting of a pair of spaced-apart finger-like members which are adapted to co-operate with a pair of oppositely disposed contact members having pointed tapered end portions, said tapered end portions adapted to enter in the space between the finger-like members and make contact therewith, and means responsive to said switch mechanism for discarding a container from the conveyor system when it is not of the proper weight.

7. In a conveyor system for detecting packages not of the proper weight having means including a flat-surfaced table-like structure over and along which the packages are moved, and a weighing station arranged with said table-like structure including a movable counterweighted platform arranged at said weighing station over which the articles are moved and conveyor means for moving the packages without interruption along said table-like structure and over and along the movable platform and through the system, and laterally actuated kicker means arranged forwardly of said platform for removing packages not of the proper weight from the conveyor system, and means responsive to the movement of said platform for controlling the actuation of said kicker means, a switch mechanism arranged with said platform, said switch mechanism consisting of a pair of spaced-apart finger-like members arranged with said platform, a pair of oppositely disposed contact members arranged at said weighing station directly opposite said finger-like members with which they co-operate, each of said contact members having end portions which taper substantially to a point which are adapted to enter the space between the finger-like members and make contact therewith upon movement of said platform.

8. In a conveyor system, the combination as defined in claim 7, including an electrical circuit having a solenoid arranged therein and means controlled by the energization of said solenoid for actuating said kicker means.

9. In a check-weighing system having weighing scales arranged therein including a movable counterweighted platform over which the articles are adapted to be moved, and means for counterbalancing said platform, and conveyor means for moving the articles over and along said movable platform and through the system, an electrical circuit including a solenoid arranged therein for controlling a laterally actuated kicker member for discarding articles not of the proper weight from said conveyor system, a switch mechanism arranged in said electrical circuit for controlling the energization of said solenoid, the actuation of said switch mechanism being controlled by the movement of said platform, said switch mechanism consisting of a pair of spaced-apart finger-like members arranged with said platform which co-operate with a pair of oppositely disposed contact members having end portions which taper to a point, the pointed tapered end portions adapted to enter between the finger-like members and make contact therewith.

10. In a check-weighing system having weighing scales arranged therein including a platform over which the articles are moved, and a second platform on which an article of the desired weight is adapted to be disposed, and linkage means interconnecting both of said first and second platforms with said second platform adapted to counterbalance said first mentioned platform when an article is positioned thereon, an electrical circuit including a solenoid arranged therein for controlling a laterally actuated kicker member for discarding articles not of the proper weight from said conveyor system, a switch mechanism arranged in said electrical circuit for controlling the energization of said solenoid, the actuation of said switch mechanism being controlled by the movement of said first mentioned platform, said switch mechanism consisting of a pair of spaced-apart finger-like members arranged with said platform which co-operate with a pair of oppositely disposed contact members having end portions which taper to a point, the pointed tapered end portions adapted to enter between the finger-like members and make contact therewith.

References Cited in the file of this patent

UNITED STATES PATENTS

| | | |
|---|---|---|
| 1,366,449 | Hallock | Jan. 25, 1921 |
| 1,649,231 | Hothersall | Nov. 15, 1927 |
| 1,747,593 | Oates et al. | Feb. 18, 1930 |
| 1,846,016 | Bryant | Feb. 23, 1932 |
| 1,927,263 | Hebden | Sept. 19, 1933 |
| 1,999,827 | Wardley | Apr. 30, 1935 |
| 2,116,895 | Howard | May 10, 1938 |
| 2,197,381 | Mansbendel | Apr. 16, 1940 |
| 2,307,695 | Mansbendel | Jan. 5, 1943 |
| 2,308,729 | Walter | Jan. 19, 1943 |
| 2,416,358 | Stillwell | Feb. 25, 1947 |
| 2,478,381 | Eckstein | Aug. 9, 1949 |
| 2,742,152 | Salwasser | Apr. 17, 1956 |